(12) United States Patent
Bowers et al.

(10) Patent No.: US 6,382,591 B1
(45) Date of Patent: May 7, 2002

(54) PLUG VALVE ASSEMBLY

(75) Inventors: David Lamar Bowers; Robert Joseph Brown, both of Cookeville; Royce Chaffin, Baxter; Donnie Ray Hammock; Gerald Patrick McDermott, both of Cookeville, all of TN (US)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 08/703,545

(22) Filed: Aug. 27, 1996

Related U.S. Application Data

(63) Continuation-in-part of application No. 08/390,407, filed on Feb. 16, 1995.

(51) Int. Cl.[7] ................................................. F16K 5/02
(52) U.S. Cl. ........................................ 251/309; 251/358
(58) Field of Search ................................ 251/309, 358; 277/373, 607, 627, 638, 639, 652

(56) References Cited

U.S. PATENT DOCUMENTS

| 4,494,730 A | * | 1/1985 | George ........................ 251/309 |
| 5,096,029 A | * | 3/1992 | Bauer et al. ......... 277/207 R X |
| 5,149,054 A | * | 9/1992 | Passerell et al. ........ 251/358 X |
| 5,154,396 A | * | 10/1992 | Conley et al. ............... 251/309 |
| 5,535,899 A | * | 7/1996 | Carlson ............... 277/235 R X |

* cited by examiner

*Primary Examiner*—John Fox
(74) *Attorney, Agent, or Firm*—Killworth, Gottman, Hagan & Schaeff, L.L.P.

(57) ABSTRACT

An improved plug valve assembly having polymerically encapsulated seats and a machined inner surface is provided. The valve assembly comprises a valve body having an internal chamber, a plug disposed within the internal chamber and seat members supporting and sealing the plug. The seat members comprise a support frame which is completely encapsulated in a polymeric material. The process for encapsulating the seats includes providing a mold having, among other features, pins which position the support frame to provide for even application of the polymeric material to the support frame.

28 Claims, 5 Drawing Sheets

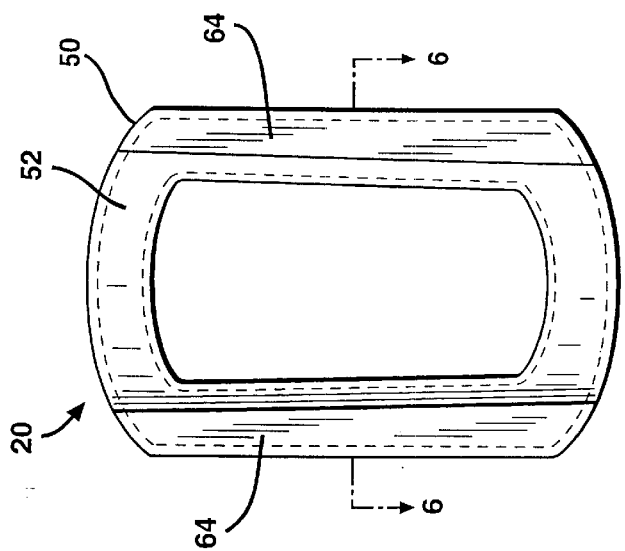
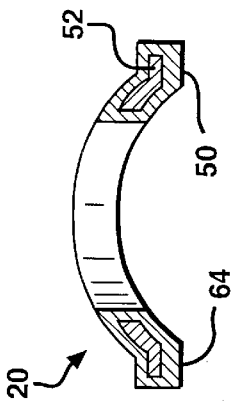
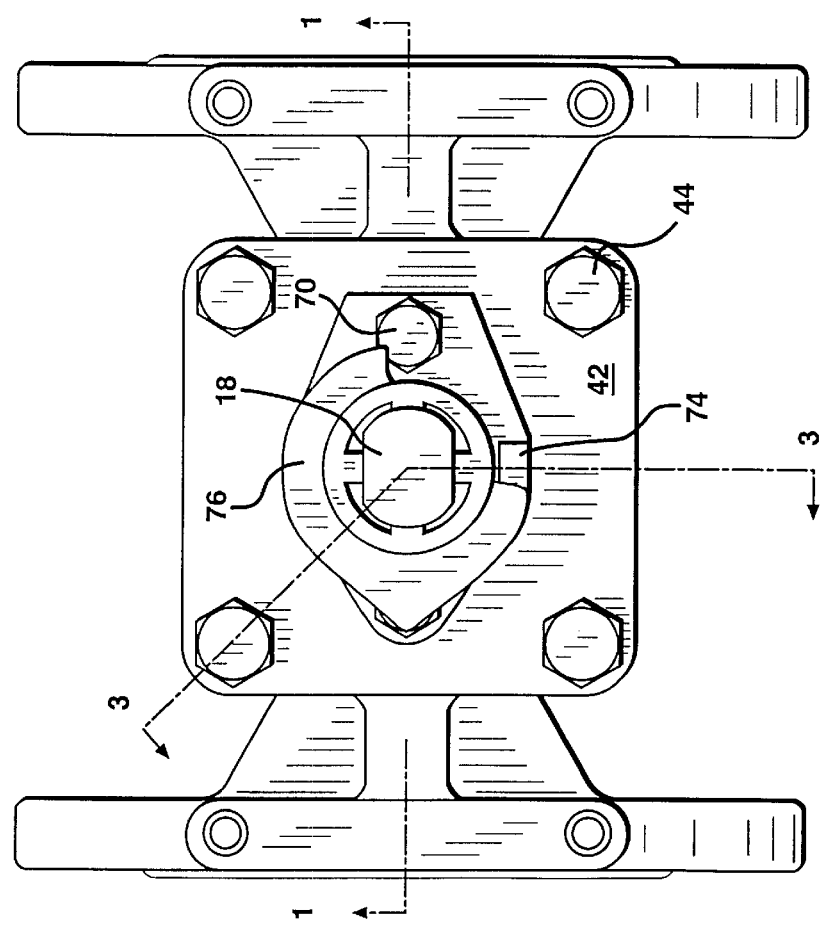

PLUG VALVE ASSEMBLY

CROSS REFERENCE TO RELATED APPLICATION

This application is a continuation-in-part of application Ser. No. 08/390,407, entitled "Plug Valve Assembly," which was filed Feb. 16, 1995.

BACKGROUND OF THE INVENTION

The present invention relates generally to plug valve assemblies, and more specifically, to plug valve assemblies employing polymerically encapsulated metal valve seats and to a method of making polymerically encapsulated metal valve seats for plug valve assemblies.

Users of valves have long desired a valve which is capable of satisfactory sealability at higher pressure drops and temperatures. Higher pressure drops place more stress upon the seals or seats inside the valve. As a result, the valve seals begin to leak or fail completely (a condition known as "blow-out"). To remedy such problems, current higher pressure operations often use plug-type valves.

Many plug valves are adjustable and, thus, can compensate for leakage. To provide greater sealability, most plug valves employ "soft" or plastic seats. Soft seats allow for greater sealability between the seat and the plug, thereby preventing leakage. However, soft seats, while providing a greater degree of sealability, increase the opportunity for blow-out. Due to the lower rigidity of soft seats, they commonly suffer blow-out at higher or throttling pressures.

To prevent blow-out, conventional soft seats are commonly reinforced by a pair of spines or ribs extending outwardly from the chamber wall on either side of the flow channel. These spines or ribs hinder the pressure created by the fluid passing through the flow channel from pushing the soft seats out of position and causing blow-out. However, inclusion of spines or projections from the chamber wall prevents the chamber wall from being easily machined, leaving the chamber wall with a rough as-cast surface.

U.S. Pat. No. 3,360,236 to Huslander discloses a plug valve seat. The seat in Huslander comprises a thin flexible core of a material such as steel with a sealing material, such as polyurethane, bonded thereto. The seat fits into grooves on the plug and rotates with the plug rather than remaining in a fixed position. However, it appears from the figures that the seat in Huslander is not encapsulated in its entirety. Rather, only the edges have been coated with a plastic material. Further, the seat is thin and flexible, providing little or no support against blow-out. Additionally, the seat rotates with the plug in pair of grooves in the plug surface. Grooves in a machined surface, such as the plug in a valve, are difficult and exceedingly expensive to machine.

U.S. Pat. No. 3,326,519 to Freed solves some of those problems mentioned above by providing an encapsulated metal reinforced valve seat. However, Freed uses a perforated metal sheet as a reinforcing material for the valve seat. A perforated sheet used as a reinforcing material for a valve seat allows the valve seat to deform when exposed to high pressures because the perforations weaken the structural integrity of the seat.

Accordingly, a need still exists for a plug valve and a seat for a plug valve which substantially reduces the required turning torque of the valve while still providing superior sealability, and protection against leakage and blow-out of the valve seats. A further need exists for a method to make such a valve seat.

SUMMARY OF THE INVENTION

The present invention meets these needs by providing an improved plug valve assembly having reduced turning torque with superior sealability and protection against seat blow-out. The plug valve assembly of the present invention substantially reduces the required turning torque while maintaining sealability by providing a chamber wall capable of being machined to a smooth surface. Turning torque is also reduced by eliminating the sleeve liner insert favored by the prior art.

In accordance with the present invention, a plug valve assembly is provided. The plug valve assembly includes a valve body having an internal chamber, a plug disposed in that internal chamber and seat members for supporting the plug. The internal chamber is defined by an inner wall. Preferably, the inner wall has a substantially smooth, machined surface, allowing reduced turning torque and greater sealability. Most preferably, the machined surface has a smoothness value of about 125 rms to about 1 rms.

The seat members function to both support the plug and to seal the valve. The seat members preferably comprise a rigid, solid support frame encapsulated in a polymeric material, but may also be formed of a metal or ceramic material. By "solid" it is meant that the support frame is essentially non-perforate. However, the support frame may be solid and still have grooves, indents, notches, and other types of locking channels or areas of reduced thickness therein. In the preferred seat members, the support frame is preferably a solid metal frame and the polymer is preferably a melt-processable polymer, such as a fluoropolymer.

The seat members form a sealing surface with both the inner wall of the internal chamber and the plug. The sealing surface with the plug may have a vertical taper of from about 1° to about 8°. The plug then has a vertical taper corresponding to the vertical taper of the sealing surface. In addition, the sealing surface with the inner wall may also have a vertical taper on the order of 1° or 8° with the inner wall having a corresponding vertical taper.

The valve assembly may further include locking members disposed in the chamber for preventing substantial horizontal, vertical or rotational movement of the seat members. These locking members fix the seat members in location in the present invention. Ideally, the locking members are depressions formed in the inner wall of the chamber. The plug valve assembly further includes an adjustment mechanism. The adjustment mechanism adjusts the plug vertically within the seat members to prevent leakage.

The method of making the encapsulated valve seats of the present invention is believed to be particularly unique. The encapsulated valve seats of this invention are formed by injection molding using a mold which has a means for positioning the support frame in the mold. The mold cavity includes at least three retractable pins which contact the support frame to position it in the center of the mold cavity during the injection of the polymeric material so that the support frame receives an even coverage of polymeric material on each side.

The method for encapsulating the valve seat includes the steps of providing a mold including a first plate having a cavity therein and a second plate having a cavity therein, the cavities forming an opening such that when the plates are brought together the opening has a shape of an encapsulated valve seat, one of the plates having an injection sprue therein; positioning a support frame in the mold so that the support frame is located in the center of the opening when the plates are brought together; bringing the plates together to close the mold and form the opening; heating the mold; injecting a heated, fluent polymeric material through the sprue into the opening to encapsulate the support frame in the polymeric material; cooling the mold and the polymeric material to solidify the polymeric material to form an encapsulated valve seat; and removing the encapsulated valve seat from the mold.

Accordingly, it is an object of the present invention to provide an improved plug valve assembly with reduced turning torque while maintaining superior sealability and protection against blow-out. It is a feature of the present invention to provide a plug valve assembly having seat members comprising a rigid support frame encapsulated in a polymeric material. It is a further feature of the present invention to provide a method for forming an encapsulated seat member for a plug valve in which the seat member comprises a rigid, solid support frame encapsulated in a polymeric material. Other objects, features and advantages of the present invention will be apparent from the following description, the accompanying drawings and the claims.

BRIEF DESCRIPTION OF THE DRAWINGS

FIG. 4 is a top view of the plug valve of the present invention.

FIG. 5 is a front view of a preferred seat member of the present invention.

FIG. 6 is a sectional top view of preferred seat member of the present invention.

DETAILED DESCRIPTION OF THE PRESENT INVENTION

The present invention comprises an improved plug valve assembly. The plug valve assembly has reduced turning torque while maintaining sealability due to a substantially smooth machined valve chamber. Further, the plug valve assembly of the present invention has superior protection from blow-out due to the use of polymerically encapsulated rigid and solid seat members.

Figure 1:
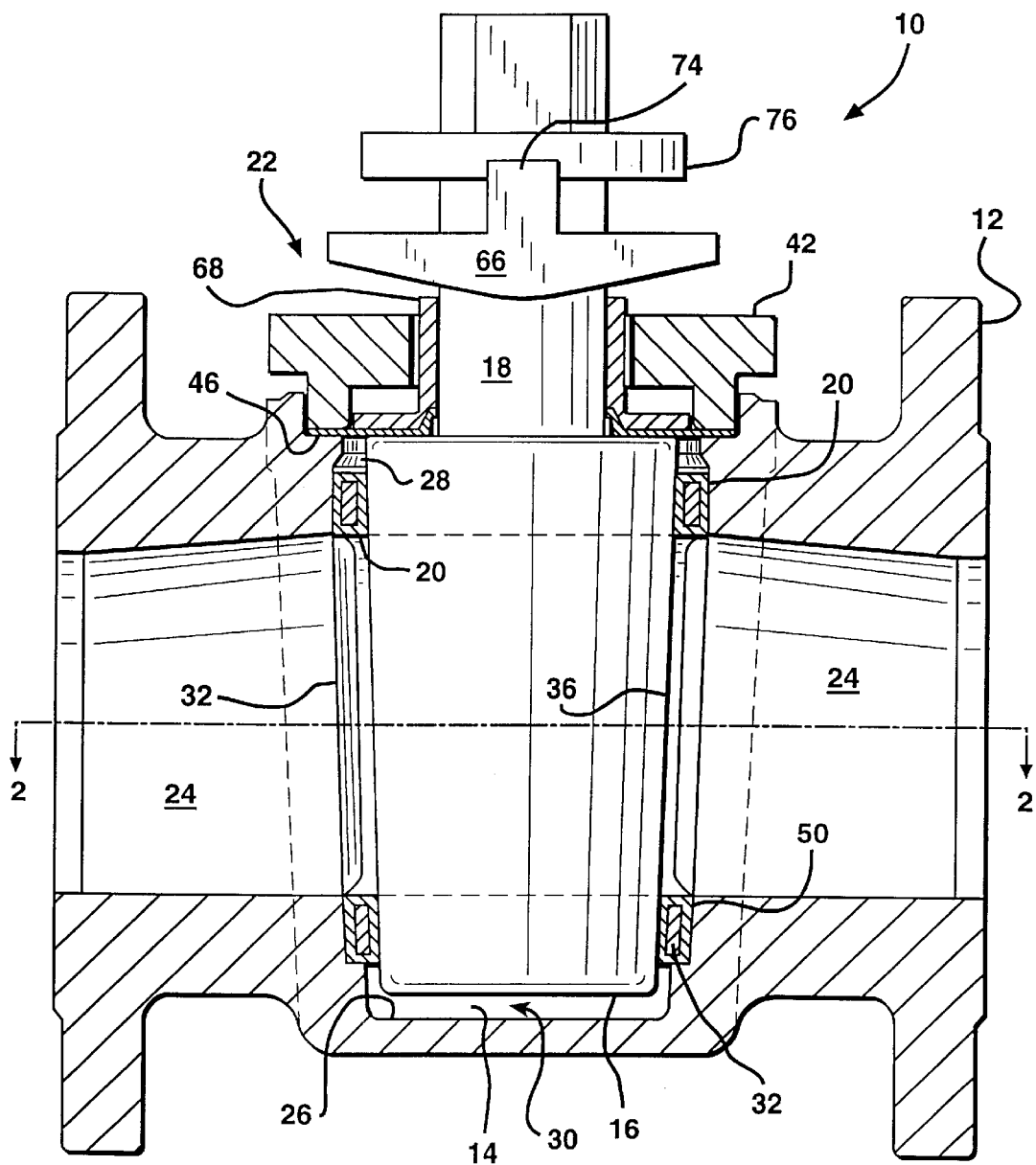
FIG. 1 is a sectional side view of the plug valve of the present invention, taken longitudinally through the center of the valve.
Figure 2:
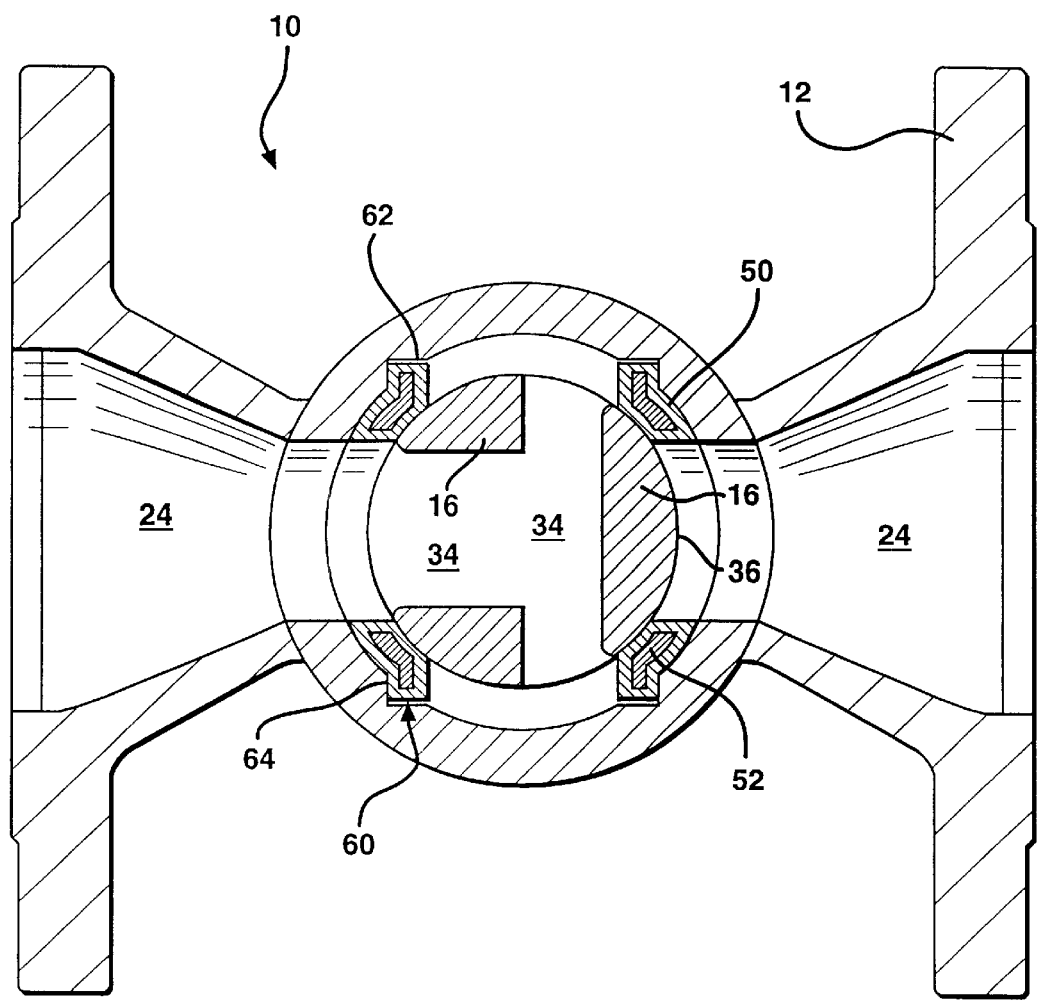
FIG. 2 is a sectional top view of the plug valve of the present invention taken along line 2—2 in FIG. 1.

Referring to FIGS. 1 and 2, the plug valve assembly 10 of the present invention may be seen. The plug valve comprises a valve body 12 with an internal chamber 14 and a plug 16 disposed within chamber 14. Seat members 20 are disposed in the chamber for supporting plug 16 as well as sealing valve 10. An adjustment mechanism 22 provides adjustability for the plug 16 and seat members 20 in chamber 14.

Valve body 12, as well as plug 16 and most other items unless otherwise described, is formed of rigid alloy material, such as a metallic alloy, plastic or other composite material. Valve body 12 may be internally coated with a corrosion resistant polymer such as polytetrafluoroethylene thereby providing support as well as corrosion resistance. Valve body 12 includes, along with chamber 14, flow channel 24.

Flow channel 24 extends longitudinally through the entirety of valve body 12 to provide a passage for fluid flow. Valve body 12 may assume various configurations as desired for functionality as well as aesthetics.

Internal chamber 14 is preferably substantially tubular. However, those skilled in the art will recognize that various other shapes may also be employed and remain within the scope of the invention. Chamber 14 includes inner wall 26. Inner wall 26 may have a vertical taper to participate in vertical adjustment of the valve 10. By vertical taper it is intended that the upper portion 28 of the chamber is wider or greater in circumference than the lower portion 30. Preferably, the vertical taper of chamber 14 is substantially conical in nature. That is, when viewing chamber 14 from above, the chamber appears as a cone with the upper portion 28 greater in circumference than lower portion 30. However, the vertical taper may also be a flat taper with only the sides 32 of chamber 14 in sealing contact with seat members 20 being tapered. The degree of the vertical taper, as are all other vertical tapers referred to in this specification, is measured from a vertical plane through the center of chamber 14. As will be hereinafter described, the vertical taper of inner wall 26 will correspond to the vertical taper of a sealing surface 23 with inner wall 26 and is from about 1° to about 8°, preferably from about 2° to about 4°, and most preferably about 2°.

Internal chamber 14 and specifically inner wall 26 preferably has a substantially smooth, machined surface as opposed to the as-cast surfaces of the prior art. In other words, rather than leaving inner wall 26 with a rougher surface resulting from the casting or formation of the valve, inner wall 26 may be machined to provide a substantially smooth surface. This potential machinability is made possible due to the absence of projections such as spines or ribs extending outwardly from the chamber surface, as is common in the prior art.

A substantially smooth, machined surface significantly reduces the required turning torque of the present invention. Further, a smooth machined surface provides for greater sealability between seat members 20 and the inner wall 26. The need for sleeve-type valve seats is eliminated. Preferably, the inner wall 26 of the present invention is machined to a smoothness value of from about 125 rms to about 1 rms.

Plug 16 is disposed within internal chamber 14. Plug 16 may also be coated with a corrosion-resistant polymer. Plug 16 has a orifice 34 passing through its entirety. Orifice 34 may also be internally coated with a corrosion-resistant polymer such as polytetrafluoroethylene. Plug 16 is adapted for rotation between open and closed positions. Plug 16 contains a top portion 18 to rotate plug 16 between the open and closed positions. Top portion 18 extends outside of valve body 12 so that external rotation of plug 16 is possible. When plug 16 is rotated to the open position as shown in section A of FIG. 2, orifice 34 is in alignment with flow channel 24 so that fluid is free to pass through both orifice 34 and flow channel 24. When plug 16 is rotated to the closed position as shown in section B of FIG. 2, orifice 34 is out of alignment with flow channel 24 so that plug side walls 36 block channel 24 and prevents the flow of fluid through the valve.

Figure 3:
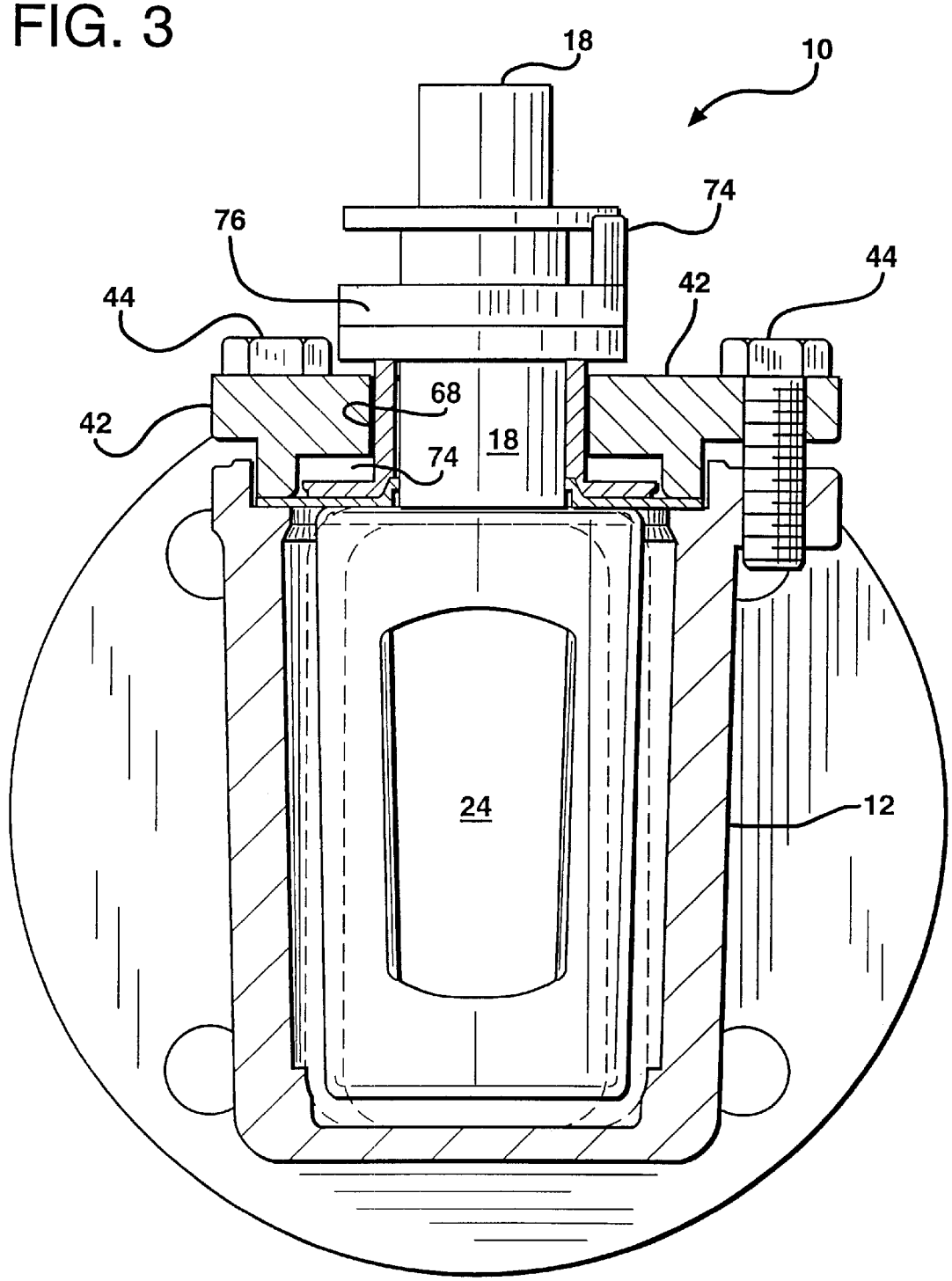
FIG. 3 is a sectional side view of an additional embodiment of the present invention.

Returning to FIG. 1, plug 16 is held into chamber 14 by means of a top cap or bonnet 42. Meanwhile, bonnet 42 is held in position by fasteners 44 as seen in FIG. 3. Fasteners 44 may be any common fastener, such as screws, bolts, pins, etc., which are suitable for the purpose. Preferably, fasteners 44 are screws. Fasteners 44 and bonnet 42 hold plug 16 in chamber 14 without preventing free-movement of the plug. That is, plug 16 remains free to rotate between open and closed positions. Further, plug 16 remains free to be vertically adjusted within the seat members 20. A sealing arrangement is employed to seal the valve top portion 18 to the valve body 12 and prevent leakage. Such arrangements may include O-rings, stem packings, bellows seals and preferably, a diaphragm 46. Diaphragm 46 can be any suitable diaphragm for sealing purposes, but is preferably a reverse-lip diaphragm of a plastic material such as a polytetrafluoroethylene. Of course, one of ordinary skill in the art will recognize that various arrangements may be employed in the present invention to prevent leakage around valve top portion 18.

Plug 16 is supported by seat members 20 disposed within chamber 14. Seat members 20 serve the dual purpose of supporting plug 16 as well as sealing valve 10. Seat members 20 seal the valve by providing two sealing surfaces, one with the inner wall 26 and one with plug 16. Seat members 20 are preferably encapsulated with a polymeric material 50 and provide a soft seat for plug 16. Soft seats provide a superior sealing surface to metal or ceramic seats. Additionally, soft seats require lower turning torque than metal or ceramic seats. However, for selective applications, such as high temperatures, seat members 20 may be formed of a metal or ceramic material. Of course, one of skill in the art will recognize that various seat members and configurations may be employed within the scope of this invention.

Turning to FIGS. 5 and 6, there is seen the preferred seat members 20 of the present invention. Seat members 20 are unitary and substantially rectangular in nature. Seat members also include flange portions 64. Seat members 20 have both a sealing surface 21 with the plug 16 and a sealing surface 23 with the inner wall 26. The sealing surface 21 with plug 16 is preferably vertically tapered on the order of from 1° to about 8°, and more preferably from about 2° to about 4°. Plug 16 is then vertical tapered to correspond to the taper of sealing surface 21. This allows plug 16 to be forced into the taper of seat members 20 by adjustment mechanism 22 thereby tightening the seal between plug 16 and seat members 20. As plug 16 is forced downward into the seat members 20 into a narrower taper, seat members 20 have a higher load or pressure applied to them. For these reasons, seat members 20 exert more outward force on the sealing surfaces, creating a tighter seal.

In addition, the sealing surface 23 with inner wall 26 may also be provided with a vertical taper of from 1° to about 8° and more preferably from about 2° to about 4°. Inner wall 26 may then be provided with a corresponding vertical taper, thereby allowing for tightening of the sealing surface 23 when plug 16 is adjusted vertically in seat members 20.

Traditional soft plug valve seats have not afforded protection against blow-out. Once the pressure drop of the valve is elevated by throttling or other means, the seats begin to leak or fail completely. To solve the problem of blow-out, in prior art valves, spines or ribs were extended from inner wall 26 on either side of flow channel 24 to prevent the soft seats from blowing out. However, such extensions prevented the machinability of inner wall 26 which resulted in an increased turning torque due to the much rougher as-cast surface.

The seat members 20 of the present invention provide superior protection against seat blow-out, without increasing turning torque. The preferred seats of the present invention comprise a support frame 52 of a solid and rigid material encapsulated with a polymeric material 50 to provide a soft seat. Support frame 52 is completely encased or covered on all surfaces with the polymeric material 50. In other words, the entire surface area of support frame 52 is covered with polymeric material 50 and no portion of support frame 52 is exposed to the liquid which flows through valve 10.

Support frame 52 may be of any suitable material such as iron, various other metal compositions and ceramics. As stated previously, support frame 52 is preferably rigid and solid. By "solid" it is meant that support frame 52 is essentially non-perforate. However, the definition of "solid" is not intended to preclude support frame 52 from having grooves, notches, indentations or areas of reduced thickness (or even holes such as locating holes 55 shown in FIG. 7) therein as long as the surface of support frame 52 is substantially free of perforations. Support frame 52 preferably has a thickness of about 1/16th to about 3/8th of an inch and most preferably has a thickness of about 1/8th to about 3/16th of an inch. The height and width of support frame will be determined by the size of the valve in which seat 20 is used. For certain applications such as higher temperatures, uncoated metal or ceramic seats may be employed.

Support frame 52 is completely encapsulated with the polymeric material 50. Polymeric material 50 has a thickness of about 30 to about 200 thousandths of an inch. In a preferred embodiment, polymeric material 50 will have a thickness of about 60 to about 150 thousandths of an inch and in a most preferred embodiment the thickness of polymeric material 50 is about 90 to about 110 thousandths of an inch. In this fashion, both the sealing surfaces with plug 16 and inner wall 14 have the benefit of a soft seal. Support frame 52 provides the rigidity the seats require to protect against blow-out without sacrificing sealability.

Figure 7:
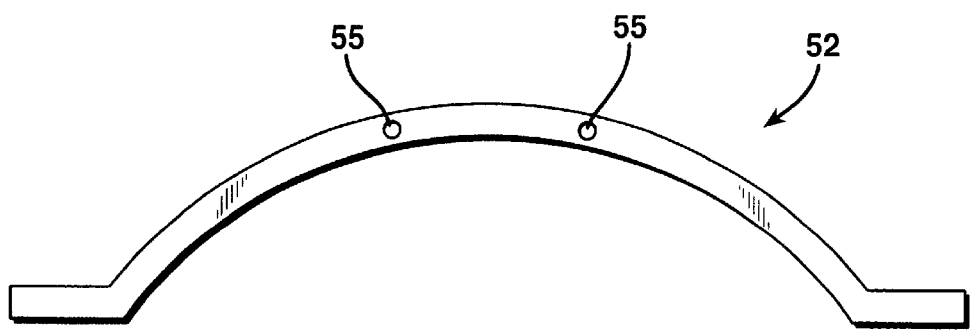
FIG. 7 is an end view of the support frame for the preferred seat member of the present invention.

FIG. 7 presents an end view of support frame 52. As can be seen in FIG. 7, support frame 52 includes at least one and preferably two locating holes 55 in its end. Locating holes 55 are provided in support frame 52 to position support frame 52 in a mold so that it receives an even coverage of polymeric material 54. The encapsulation method and the function of locating holes 55 will be discussed in detail below. The other end of support frame 52, not shown, will also have at least one and preferably two locating holes 55. For proper positioning of support frame 52 in the mold, support frame will have a total of at least 3 and preferably four locating holes 55.

Preferably, the valve 10 of the present invention includes locking members 60 disposed in internal chamber 14. Turning to FIG. 2, there is seen locking members 60 disposed within chamber 14. Locking members 60 prevent substantial horizontal, vertical or rotational movement of seat members 20 within the chamber. Thus, seat members 20 are fixed within the chamber 14. It will be recognized that a minimal amount of movement is possible without departing from the scope of the invention. Rather, the purpose of locking mechanism 60 is to prevent seat members 20 from leaving the position in which they will provide a sealing arrangement with plug 16.

Locking members 60 are preferably depressions 62 disposed in the sides of chamber 14 into which flange portion 64 of seat members 20 extend. By disposing depressions 62 in both sides of chamber 14 and extending seat members 20 into the depressions via flange portion 64, horizontal, vertical or rotational movement in either direction is prevented or minimized.

The valve 10 of the present invention is externally adjustable to compensate for leaks in the valve due, in part, to seat wear or increased pressure. The adjustment mechanism 22 of the present invention involves applying or reducing force on plug 16, thereby manipulating the plug 16 vertically within the seat members 20. Application of force wedges plug 16 further into the vertical taper of sealing surface 21, thereby applying an increased load on the sealing surface 21 and tightening the seal. Pressure on the sealing surface 21 then transfers through seat members 20 and is applied to sealing surface 23 thereby sealing the surface between inner wall 26 and seat members 20. One of ordinary skill in the art will recognize that various arrangements may be employed with which plug 16 may be adjusted within seat members 20, and that the adjustment mechanism described herein is merely a preferred embodiment of the adjustment mechanism 22.

Turning to FIG. 1, there is seen adjustment mechanism 22. Adjustment mechanism 22 comprises an adjuster 66 adapted to apply pressure to plug 16. Adjuster 66 is preferably formed as a wedge shaped collar as shown in FIG. 1. As seen in FIG. 4, adjuster 66 further includes a tab 74 extending upwardly. Tab 74, in conjunction with stop collar 76 prevents top portion 18 and consequently, plug 16 from over rotating when turning and potentially damaging seat members 20. As seen in FIG. 4, stop collar 76 is attached to top portion 18 and is preferably formed as a ring with a quarter-section removed. As plug 16 is rotated, stop collar 76 is correspondingly rotated. Tab 74 then limits the range of motion of stop collar 76 and top portion 18 to that within the removed quarter-section.

Returning to FIG. 1, adjuster 66 is preferably adapted to press against plug 16 through the use of thrust collar 68. Thrust collar 68 allows uniform pressure to be applied to plug 16. To increase the applied pressure as well as maintain the amount of pressure applied, fasteners 70 can be manipulated to apply a load through adjuster 66 to thrust collar 68. Fasteners 70 preferably comprise screws which pass through adjusting plate 66 and into bonnet 42. Fasteners 70 can be externally tightened to increase the pressure applied to thrust collar 68 and consequently plug 16.

As fasteners 70 are manipulated, adjuster 66 is drawn against thrust collar 68 thereby increasing the pressure applied to thrust collar 68 and transferring the applied load. Hollow space 72 provides an area of movement for thrust collar 68. As the load transferred to thrust collar 68 is increased, load is transferred through diaphragm 46 to plug 16. In this fashion, adjusting mechanism 22 is capable of externally adjusting valve 10. Of course, one of skill in the art will recognize that the above described adjustment mechanism is merely the preferred mechanism and that variations are possible while remaining within the scope of the invention.

Figure 8:
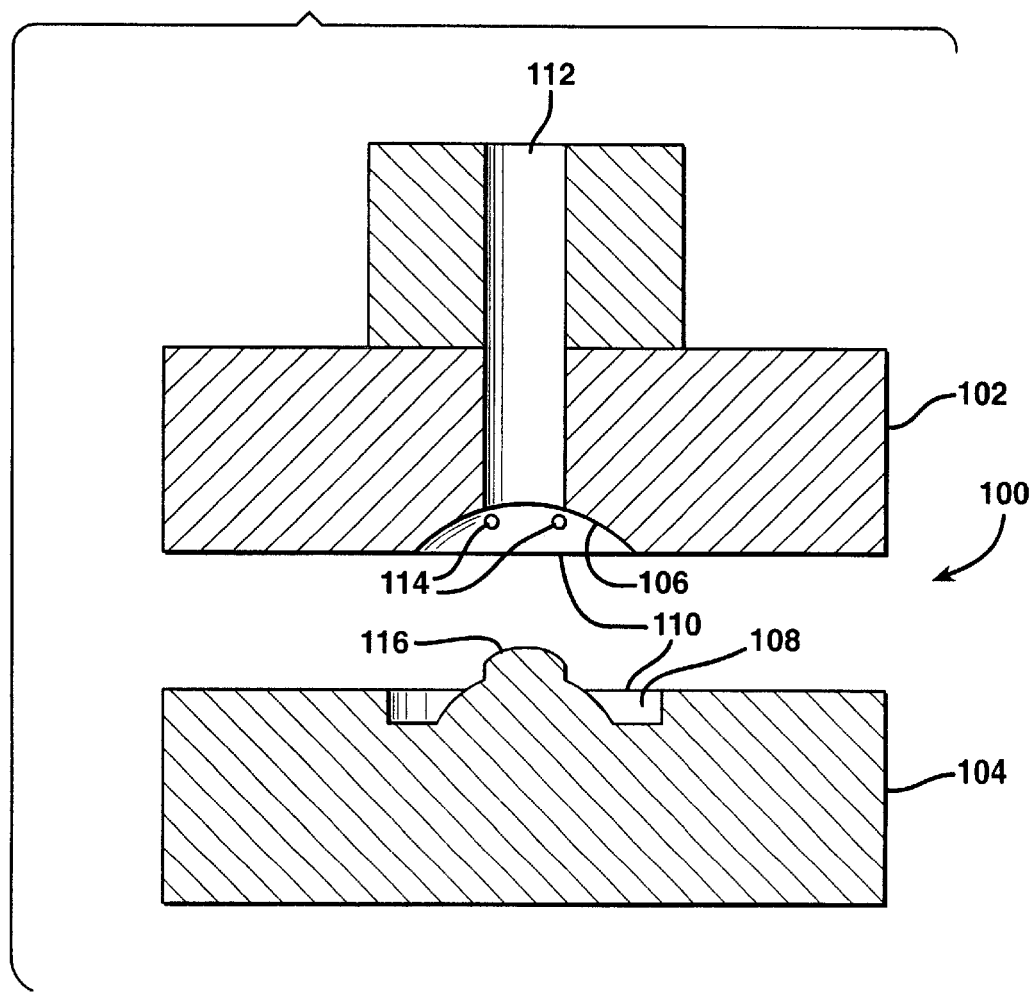
FIG. 8 is a sectional view of a mold used to encapsulate the rigid, solid support frame of the seat member in a polymeric material.

FIG. 8 shows a cross sectional view of a mold which can be used to encapsulate support frame 52 of seat member 20 in polymeric material 50. The mold 100 comprises a first, upper plate 102 and a second, lower plate 104. Upper plate 102 has a first cavity 106 formed therein and lower plate 104 has a second cavity 108 formed therein. When the two mold plates are brought together, first cavity 106 and second cavity 108 form an opening 110 having the shape and dimensions of an encapsulated seat member 20. Upper plate 102 also includes injection sprue 112 which is provided to feed polymeric material into opening 110 and enters first cavity 106 perpendicular to upper plate 102.

Mold 100 also includes pins 114 which are provided to position support frame 52 in opening 110 so that support frame 52 receives an even coverage of polymeric material 50 during the molding process. Pins 114 are positioned in mold 100 so that they contact locating holes 55 in each end of support frame 52 to position support frame 52 approximately in the center of opening 110 so that support frame 52 receives an even coverage of polymeric material 50. There are at least three and preferably four pins 114. When three pins 114 are employed, two of the pins will be positioned so that they contact locating holes 55 in one end of support frame 52 in a spaced apart relation while the other pin will be positioned so that it contacts a locating hole 55 in the opposite end of support frame 52. The engagement of pins 114 with locating holes 55 in support frame 52 prevents support frame 52 from moving vertically in opening 110 and also prevents the sides of support frame 52 from rotating toward the top of opening 110 as polymeric material 50 is injected into opening 110.

Finally, mold 100 includes a core 116 which prevents polymeric material 54 from covering the center aperture of seat 20. Core 116 is extends from lower plate 104.

Support frame 52 is encapsulated in polymeric material 50 in the following manner. Support frame 52 is placed into second cavity 108 in lower plate 104 of mold 100. Pins 114 are extended so that they contact and engage locating holes 55. After support frame 52 has been positioned in cavity 108, upper plate 102 and lower plate 104 are brought together to close mold 100 so that first cavity 106 and second cavity 108 form opening 110.

Once mold 100 has been closed and opening 110 has been formed, a heated, fluent polymeric material is injected into injection sprue 112 and into opening 110. The polymeric material is fed into opening 110 around core 116 so that support frame 52 is completely encapsulated in polymeric material 50. As polymeric material 50 is fed into opening 110, the flow of polymeric material 50 would force support frame 52 upwardly in the mold if not for pins 114. Pins 114 prevent support frame 52 from being forced upwardly in opening 110 toward the top of cavity 106 while the polymeric material is being injected into opening 110 so that support frame 52 receives an even application of polymeric material 50. Pins 114 contact locating holes 55 so that support frame 52 is spaced away from the inner diameter of opening 110 a distance slightly greater than the desired depth of coating for support frame 52.

After a volume of polymeric material 50 sufficient to encapsulate support frame 52 has been fed into opening 110, the feeding of polymeric material 50 into mold 100 is ceased and mold 110 is then cooled. As mold 100 is being cooled, pins 114 are retracted from contact with locating holes 55. Because mold 100 and polymeric material 50 cool from the outside inwardly, once pins 114 are retracted, polymeric material 50, which has not yet solidified, flows into the space previously occupied by pins 114 to complete the encapsulation of support frame 52. Mold 100 is then cooled further to complete the curing of polymeric material 50.

Once mold 100 has been sufficiently cooled, upper plate 102 is separated from lower plate 104 to open mold 100. The polymerically encapsulated seat member 20 is then removed from mold 100. As stated above, the thickness of the layer of polymeric material 50 on support frame 52 is about 30 to about 200 thousandths of an inch. Preferably, the thickness of polymeric material 50 is between about 60 and about 150 thousandths of an inch and most preferably between about 90 and 110 thousandths of an inch.

Polymeric material 50 used in the present invention is preferably a melt processable polymer. Melt processable polymers are well known to those of skill in the art.

Examples of suitable polymers include various members of the fluoropolymer family, which includes Teflon PFA®, Teflon FEP® and Tefzel®, all of which are available from DuPont de Nemours & Co. of Wilmington, Del., and Ryton® which is available from the Phillips Petroleum Company of Bartlesville, Okla. Ryton® has been found to be particularly effective in high temperature applications. In a more preferred embodiment, polymeric material 50 is Teflon PFA®. The use of a melt processable polymer allows a rigid, solid support frame to be used for seat member 20 because it is no longer necessary to provide a piece of metal with perforations to cause polymeric material to remain attached to that piece of metal.

To provide for proper processabilty of the polymeric material during the molding process, both mold 100 and the polymeric material are preferably heated. For example, if the polymeric material is a fluoropolymer, the material should be heated to a temperature between about 400° F. (204° C.) and about 650° F. (327° C. ) and preferably between about 580° F. (304° C.) and about 620° F. (327° C.). Mold 100 is preferably heated to a temperature which ranges from approximately 400° F. (204° C. ) to approximately 600° F. (316° C.) before the polymeric material is injected to prevent premature curing of the polymeric material. If mold 100 is not heated, polymeric material will freeze on support frame 52 in a series of layers which reduces the structural stability of seat members 20.

Although mold 100 has been described herein as comprising an "upper" plate 102 and a "lower" plate 104, the designations, "upper" and "lower," are provided solely to facilitate reference to the figure. Mold 100 could have a vertical orientation or any other orientation which would facilitate its operation. Further, although injection sprue 112 is described in relation to upper plate 102, one skilled in the art will appreciate that the position of sprue 112 depends upon the positioning of mold 100.

Accordingly, the plug valve of the present invention provides significant improvements over valves of the prior art. The valve of the present invention allows a substantially smooth surface machined into the inner wall of the chamber, if desired. This provides for reduced required turning torque and greater sealability. Further, the valve of the present invention employs valve seats comprising a rigid, solid support frame encapsulated with a polymeric material. This allows for the elimination of spines or ribs extending from the inner wall of the chamber, and preventing the valve seats from blowing out, which, in turn, allows for machinability of the chamber.

The encapsulation method of this invention also offers advantages. First, it provides an inexpensive and effective method for encapsulating valve seats. Second, it provides a method for encapsulating valve seats in which a rigid, solid support frame is evenly encapsulated with a polymeric material.

Having described the invention in detail and by reference to the preferred embodiments thereof, it will be apparent that modifications and variations are possible without departing from the scope of the invention which is defined in the appended claims.

What is claimed is:

1. A plug valve comprising:
   a valve body having an internal chamber formed therein, the chamber being defined by an inner wall having ports opening into the chamber in an angularly spaced relation;
   a plug disposed within the chamber the plug having a port therethrough for alignment with the ports in the inner wall of the chamber and adapted to rotate between an open position and a closed position; and
   seat members disposed in the chamber for supporting the plug, the seat members comprising a rigid, solid support frame encapsulated in a polymeric material, by
      providing a mold including a first plate having a cavity therein and a second plate having a cavity therein, the cavities forming an opening such that when the plates are brought together the opening has a shape of an encapsulated valve seat, one of the plates having an injection sprue therein;
      positioning a rigid, solid support frame in the mold so that the support frame is located in the center of the opening when the plates are brought together;
      bringing the plates together to close the mold and form the opening;
      heating the mold;
      injecting a heated, fluent polymeric material through the sprue into the opening to encapsulate the support frame in the polymeric material;
      cooling the mold and the polymeric material to solidify the polymeric material to form an encapsulated valve seat; and
      removing the encapsulated valve seat from the mold.

2. The plug valve assembly of claim 1 wherein the polymeric material is a melt-processable polymer.

3. The plug valve assembly of claim 2 wherein the melt-processable polymer is a fluoropolymer.

4. The plug valve assembly of claim 1 wherein the inner wall of the chamber has a smooth, machined surface.

5. The plug valve assembly of claim 4 wherein the smooth, machined surface has a smoothness value of from about 125 rms to about 1 rms.

6. The plug valve assembly of claim 5 wherein the seat members have a sealing surface with the inner wall of the chamber and a sealing surface with the plug.

7. The plug valve assembly of claim 6 wherein the sealing surface of the seat members with the plug has a first vertical taper and the plug has a corresponding vertical taper and the sealing surface of the seat members with the inner wall has a second vertical taper and the inner wall has a corresponding vertical taper.

8. The plug valve assembly of claim 7 wherein the vertical taper of both the plug and the sealing surface of the seat members with the plug is from about 1° to about 8° as measured from a vertical plane and the vertical taper of both the inner wall and the sealing surface of the seat members with the inner wall is from 1° to about 8° as measured from a vertical plane.

9. The plug valve assembly of claim 1 wherein the polymeric material on the encapsulated valve seat has a thickness of about 30 to about 200 thousandths of an inch.

10. The plug valve assembly of claim 9 wherein the thickness is about 60 to about 150 thousandths of an inch.

11. The plug valve assembly of claim 10 wherein the thickness is about 90 to about 110 thousandths of an inch.

12. The plug valve assembly of claim 1 wherein the support frame has a thickness of about 1/16th to about 3/8th of an inch.

13. The plug valve assembly of claim 12 wherein the support frame has a thickness of about 1/8th to about 3/16th of an inch.

14. A plug valve comprising:
   a valve body having an internal chamber found therein, the chamber being defined by an inner wall having ports opening into the chamber in an angularly spaced relation;

a plug disposed within the chamber having a port therethrough for alignment with the ports in the inner wall of the chamber and adapted to rotate between an open position and a closed position;

seat members disposed in the chamber for supporting the plug, the seat members comprising a rigid, solid support frame encapsulated in a polymeric material; and an adjustment mechanism for adjusting the plug vertically within the seat members.

15. The plug valve assembly of claim 14 wherein the polymeric material is a melt-processable polymer.

16. The plug valve assembly of claim 15 wherein the melt processable polymer is a fluoropolymer.

17. The plug valve assembly of claim 14 wherein the inner wall of the chamber has a smooth, machined surface.

18. The plug valve assembly of claim 17 wherein the smooth, machined surface has a smoothness value of from about 125 rms to about 1 rms.

19. The plug valve assembly of claim 15 wherein the seat members have a sealing surface with the inner wall of the chamber and a sealing surface with the plug.

20. The plug valve assembly of claim 19 wherein the sealing surface of the seat members with the plug has a first vertical taper and the plug has a corresponding vertical taper and the sealing surface of the seat members with the inner wall has a second vertical taper and the inner wall has a corresponding vertical taper.

21. The plug valve assembly of claim 20 wherein the vertical taper of both the plug and the sealing surface of the seat members with the plug is from about 1° to about 8° as measured from a vertical plane and the vertical taper of both the inner wall and the sealing surface of the seat members with the inner wall is from 1° to about 8° as measured from a vertical plane.

22. The plug valve assembly of claim 14 further including locking members disposed in the chamber fixing the seat members in position thereby preventing substantial horizontal, vertical or rotational movement of the seat members.

23. The plug valve assembly of claim 22 wherein the locking members are depressions formed in the inner wall of the chamber.

24. The plug valve assembly of claim 14 wherein the polymeric material on the encapsulated valve seat has a thickness of about 30 to about 200 thousandths of an inch.

25. The plug valve assembly of claim 24 wherein the polymeric material on the encapsulated valve seat has a thickness of about 60 to about 150 thousandths of an inch.

26. The plug valve assembly of claim 25 wherein the polymeric material on the encapsulated valve seat has a thickness of about 90 to about 110 thousandths of an inch.

27. The plug valve assembly of claim 14 wherein the support frame has a thickness of about 1/16th to about 3/8th of an inch.

28. The plug valve assembly of claim 14 wherein the support frame has a thickness of about 1/8th to about 3/16th of an inch.

* * * * *

UNITED STATES PATENT AND TRADEMARK OFFICE
CERTIFICATE OF CORRECTION

PATENT NO.    : 6,382,591 B1
DATED         : May 7, 2002
INVENTOR(S)   : Bowers et al.

It is certified that error appears in the above-identified patent and that said Letters Patent is hereby corrected as shown below:

Column 10,
Line 5, "polymeric material, by" should be -- polymeric material by --;
Line 64, "internal chamber found therein" should be -- internal chamber formed therein --;

Column 11,
Line 19, "of claim 15" should be -- of claim 14 --.

Signed and Sealed this

Twelfth Day of November, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,382,591 B1
DATED : May 7, 2002
INVENTOR(S) : Bowers et al.

It is certified that error appears in the above-identified patent and that said Letters Patent is hereby corrected as shown below:

Title page,
Item [*] Notice, delete "0" and insert -- 1283 --.

Signed and Sealed this

Thirtieth Day of August, 2005

JON W. DUDAS
*Director of the United States Patent and Trademark Office*